(12) United States Patent
Pantos et al.

(10) Patent No.: US 8,615,630 B2
(45) Date of Patent: Dec. 24, 2013

(54) SYSTEMS AND METHODS FOR MANAGING DATA STORAGE

(75) Inventors: Roger Pantos, Sunnyvale, CA (US); James D. Batson, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 1219 days.

(21) Appl. No.: 12/145,784

(22) Filed: Jun. 25, 2008

(65) Prior Publication Data

US 2009/0006736 A1    Jan. 1, 2009

Related U.S. Application Data

(60) Provisional application No. 60/937,877, filed on Jun. 28, 2007.

(51) Int. Cl.
  *G06F 12/00*    (2006.01)
(52) U.S. Cl.
  USPC ............ 711/118; 711/170; 711/100; 714/718

(58) Field of Classification Search
  USPC .......................... 711/170, 118, 100; 714/718
  See application file for complete search history.

(56) References Cited

U.S. PATENT DOCUMENTS

| | | | |
|---|---|---|---|
| 6,389,473 B1 | 5/2002 | Carmel et al. | |
| 7,730,238 B1 * | 6/2010 | Arulambalam et al. | 710/52 |
| 2003/0067877 A1 * | 4/2003 | Sivakumar et al. | 370/232 |
| 2008/0117926 A1 * | 5/2008 | Bassali et al. | 370/412 |

\* cited by examiner

*Primary Examiner* — Matthew Bradley
*Assistant Examiner* — Ramon A Mercado
(74) *Attorney, Agent, or Firm* — Novak Druce Connolly Bove + Quigg LLP

(57) ABSTRACT

This invention is directed to a system by which data received by an electronic device from a server may be selectively stored in cache. The electronic device may define an anchor that is related to the current position of a playhead reading data stored in cache. The electronic device may then dynamically assign values to each data block of the received file based on the position of the anchor. As the anchor moves, the value of data blocks changes, and new incoming data may replace less valuable data previously stored in cache.

22 Claims, 4 Drawing Sheets

SYSTEMS AND METHODS FOR MANAGING DATA STORAGE

CROSS-REFERENCE TO RELATED APPLICATION

This application claims the benefit of U.S. Provisional Application No. 60/937,877 filed Jun. 28, 2007, which is incorporated by reference herein in its entirety.

BACKGROUND OF THE INVENTION

This relates to a system for managing data received by an electronic device.

Users of electronic devices may access different content by transmitting appropriate requests to servers. In response to a request, a server may transmit the requested data to the requesting electronic device. The electronic device may locally store or cache the received data for processing by one or more applications of the electronic device. For example, the electronic device may request a media file (e.g., a video), and cache or store in memory the requested media file for playback for the user.

In some embodiments, the user of the electronic device may request a file that exceeds the capacities of the electronic device. For example, the user may request a file that is larger than the available memory or cache of the electronic device. To accommodate excessive files, and in particular to accommodate excessively large files, the electronic device may selectively cache or store in memory received data.

Using an approach known in the art, the electronic device may continuously store incoming data provided using a speculative read from the network by replacing the last used data block stored in cache or in memory with the new data. While such an approach may be sufficient for non-media files, it may be inefficient when storing media files. In particular, such an approach may not take into account the nature of the media file, and may cause the electronic device to evict unused data blocks or recently read data blocks that are of more interest than the newly received data.

Accordingly, there is a need for a system and process by which an electronic device may selectively evict data from cache in favor of newly received data based on the identity of the newly received data. In particular, it may be desirable to assign a dynamic value to each data block of a file for determining whether or not to cache data received by an electronic device.

SUMMARY OF THE INVENTION

An electronic device may be operative to receive data transmitted by a server. For example, in response to a request for a file transmitted by the electronic device (e.g., to stream a media file), the server may provide data defining the requested file to the electronic device. In some embodiments, the requested file may be larger than the storage capabilities of the electronic device (e.g., larger than the available cache or memory). To manage the larger incoming data file, the electronic device may manage the data that is locally stored in cache or memory.

The electronic device may assign a dynamic value to each data block of the requested file. For example, the electronic device may assign a high value to the data blocks that are currently being used or that will be used shortly (e.g., the data blocks corresponding to or adjacent to the current playback position of a media file), a lower value to data blocks that will not be used in the near future (e.g., the data blocks that correspond to media away from the current playback position), and the lowest value to data blocks that are behind the currently used data blocks (e.g., the data blocks corresponding to media behind the playback position, for example blocks that were previously used or that were skipped). In some embodiments, the application consuming the data blocks stored in cache may explicitly set a value for particular data blocks (e.g., data blocks in classes of media files).

Because the playhead reading the data blocks in cache may skip around, the electronic device may define an anchor that is dynamically modified based on the playhead position. The anchor may be operative to model the playback of the file by identifying the earliest data block that the playhead is expected to read (e.g., such that the data blocks located before the anchor include only data for previously used or skipped media). The electronic device may assign a higher priority to the data ahead of the anchor, and a lower priority to the data behind the anchor, where the data ahead and in the vicinity of the anchor (e.g., the currently used or soon to be used data) has the highest priority.

When the cache is full, the electronic device may dynamically compare the value of received data with the value of data already stored in cache. If the received data is more valuable than data stored in cache, the electronic device may evict the data stored in cache and replace it with the received data. If instead the data stored in cache is more valuable than the received data, the electronic device may ignore the received data and pause the received data stream. The electronic device may then resume the paused data stream when the value of the last received data is higher than the value of data stored in cache (e.g., due to the dynamic nature of the value of the received data and of the locally stored data based on the moving anchor).

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

Figure 1:
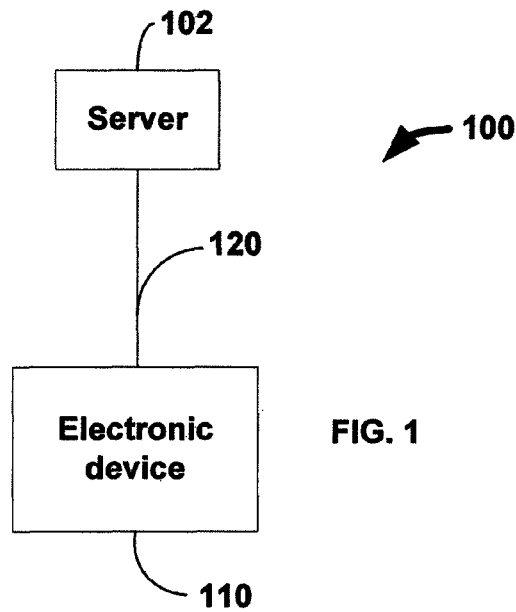
FIG. 1 is a schematic view of an illustrative media system in accordance with one embodiment of the invention.

FIG. 1 is a schematic view of an illustrative media system in accordance with one embodiment of the invention. Media system 100 may include server 102 and electronic device 110. In some embodiments, media system 100 may include several servers 102 and several electronic devices 110. To avoid overcomplicating the drawing however, only one sever 102 and one electronic device 110 is shown in FIG. 1.

Server 102 and electronic device 102 may communicate over communications link 120. Communications link 120 may include any suitable wired or wireless communications link, or combinations thereof, by which data may be exchanged between server 102 and electronic device 110. For example, communications link 120 may include a satellite link, a fiber-optic link, a cable link, an Internet link, or any other suitable wired or wireless link. Communications link 120 may transmit data using any suitable communications protocol supported by the medium of communications link 120. Such communications protocols may include, for example, Wi-Fi (e.g., a 802.11 protocol), Ethernet, Bluetooth (registered trademark), high frequency systems (e.g., 900 MHz, 2.4 GHz, and 5.6 GHz communication systems) infrared, TCP/IP (e.g., and the protocols used in each of the TCP/IP layers), HTTP, FTP, RTP, RTSP, SSH, or any other communications protocol or combination of communications protocols.

Server 102 may include any suitable server for providing data to electronic device 110. For example, server 102 may include a file server, a database server, a web server, an FTP server, a VPN server, a proxy server, or any other server operative to provide data to electronic device 110 (e.g., a YouTube server). In some embodiments, server 102 may include a media server operative to provide media to electronic device 102 (e.g., a video server operative to provide video to the electronic device such as, for example a YouTube server).

Electronic device 110 may include any electronic device operative to communicate with a server.

For example, electronic device 110 may include a media player such as an iPod available by Apple Inc., of Cupertino, Calif., a cellular telephone, pocket-sized personal computers such as an iPAQ Pocket PC available by Hewlett Packard Inc., of Palo Alto, Calif., personal digital assistants (PDAs), a desktop computer, a laptop computer, and any other device capable of communicating via wires or wirelessly (with or without the aid of a wireless enabling accessory system).

Figure 2:
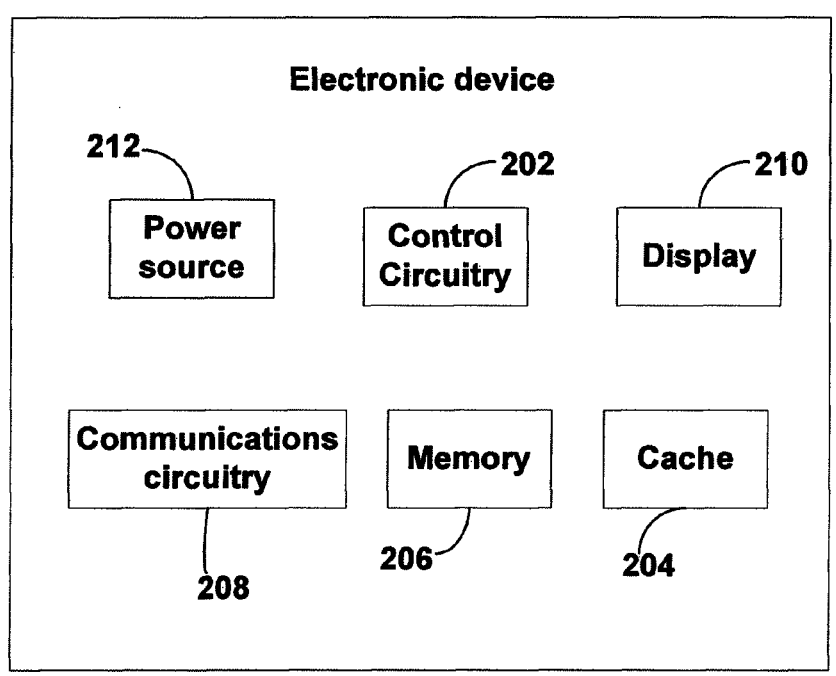
FIG. 2 is a simplified block diagram of an illustrative electronic device in accordance with one embodiment of the invention.

FIG. 2 is a simplified block diagram of an illustrative electronic device in accordance with one embodiment of the invention. Electronic device 200 may include control circuitry 202, cache 204, memory 206, communications circuitry 208 and display 210. In some embodiments, electronic device 200 may include more than one of each component, but for the sake of clarity, only one is shown in FIG. 2.

Control circuitry 202 may include any suitable circuitry for controlling the operations of electronic device 200. Control circuitry 202 may be coupled to any other suitable component of electronic device 200. For example, control circuitry 202 may be coupled to memory, a storage device, communications circuitry, a display, audio circuitry, a bus, an I/O component, audio output circuitry, or any other suitable component. In some embodiments, control circuitry 202 may include a coder/decoder (CODEC) to convert digital audio signals into an analog signal, which may be provided to an output port (not shown)

Cache 204 may include one or more different types of memory which may be used for temporarily storing data for electronic device applications. Cache 204 may be stored on any suitable storage component including, for example, a hard-drive, flash memory, permanent memory such as ROM, semi-permanent memory such as RAM, or any other suitable type of storage component.

Memory 206 may include one or more storage mediums, including for example, a hard-drive, flash memory, permanent memory such as ROM, semi-permanent memory such as RAM, or cache. Memory 206 may store media (e.g., music and video files), software (e.g., for implementing functions on device 200), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 200 to establish a wireless connection), subscription information (e.g., information that keeps tracks of podcasts or television shows or other media a user subscribes to), contacts information (e.g., telephone numbers and email address), calendar information, and any other suitable data.

Communications circuitry 208 may enable device 200 to communicate with one or more server (e.g., server 102, FIG. 1) using any suitable communications protocol. For example, communications circuitry 208 may support Wi-Fi (e.g., a 802.11 protocol), Ethernet, Bluetooth (registered trademark), high frequency systems (e.g., 900 MHz, 2.4 GHz, and 5.6 GHz communication systems), infrared, TCP/IP (e.g., and the protocols used in each of the TCP/IP layers), HTTP, FTP, RTP, RTSP, SSH, or any other communications protocol or combination of communications protocols.

Display 210 include any suitable screen for displaying media objects or other content to a user. For example, display 108 may be a television, a projector, a monitor (e.g., a computer monitor), a media device display (e.g., a media player or video game console display), a communications device display (e.g., a cellular telephone display), a component coupled with a graphical output device, any combinations thereof, or any other suitable screen. In some embodiments, screen 108 may be operative to provide for an audio output.

In some embodiments, electronic device 200 may include an input device coupled to control circuitry 202 using any suitable connection, including for example any suitable wired or wireless connection. The input device may include any suitable mechanism for providing user inputs or instructions to electronic device 200, and may take a variety of forms. For example, the input mechanism may include a button, keypad, dial, a click wheel touchpad, scroll wheel, arrow keys, joystick a touch-sensitive input mechanism, a touchpad, or a touch screen. In some embodiments, the input mechanism may include a multi-touch screen such as that described in U.S. patent application Ser. No. 11/038,590, filed Jan. 18, 2005, and in U.S. Pat. No. 6,323,846, both of which are incorporated by reference herein in its entirety. The user interface may emulate a rotary phone or a multi-button electronic device pad, which may be implemented on a touch screen or the combination of a click wheel or other user input device and a screen. A more detailed discussion of such a rotary phone interface may be found, for example, in U.S. patent application Ser. No. 11/591,752, filed Nov. 1, 2006, entitled "Touch Pad with Symbols based on Mode," which is incorporated by reference herein in its entirety.

Power supply 212 may provide power to the components of device 200. For example, power supply 212 may be coupled to a power grid (e.g., a personal computer). As another example power supply 212 may include one or more batteries for providing power in a portable device. As still another example, power supply 212 may be configured to generate power in a portable device from a natural source (e.g., solar power using solar cells).

A media server may provide data to the electronic device using an suitable approach. In some embodiments, the server may transmit a bulk download vehicle that takes advantage of the TCP/IP congestion control mechanism in response to a bulk data request from the electronic device. The server may transmit an increasingly large stream (e.g., a bulk download vehicle) to the electronic device until the electronic device or the network cannot support the stream. Instead or in addition to the bulk download vehicle, the server may provide an additional small data stream for providing specific data requested by the electronic device. For example, in response to a specific request for data that is not transmitted by the bulk download vehicle, or that will not be transmitted within a short delay, the server may provide an additional small data stream that includes the data specifically requested. This and other approaches may be found in concurrently filed U.S. application No. 60/937,866, filed Jun. 28, 2007, entitled "IMPROVED METHODS AND SYSTEMS FOR RAPID DATA ACQUISITION OVER THE INTERNET."

The electronic device may store received data transmitted from a server using any suitable approach. In some embodiments, the electronic device may first store received data in cache (e.g., cache 204, FIG. 2) and then copy the data to memory (e.g., memory 206, FIG. 2). To process the data, the electronic device may copy the data back into cache. Alternatively, the electronic device may store the data in cache for immediate processing (e.g., without passing data to memory). This approach may be used, for example, when the electronic device streams media for immediate playback (e.g., the electronic device stores and reads the data stored in cache).

In some embodiments, the electronic device may instead store the received data directly in memory. This approach may be used, for example, when the electronic device downloads media. To play back downloaded media, the electronic device may copy the portions of the downloaded media that are played back to the cache for access by the control circuitry (e.g., control circuitry 202).

Figure 3:
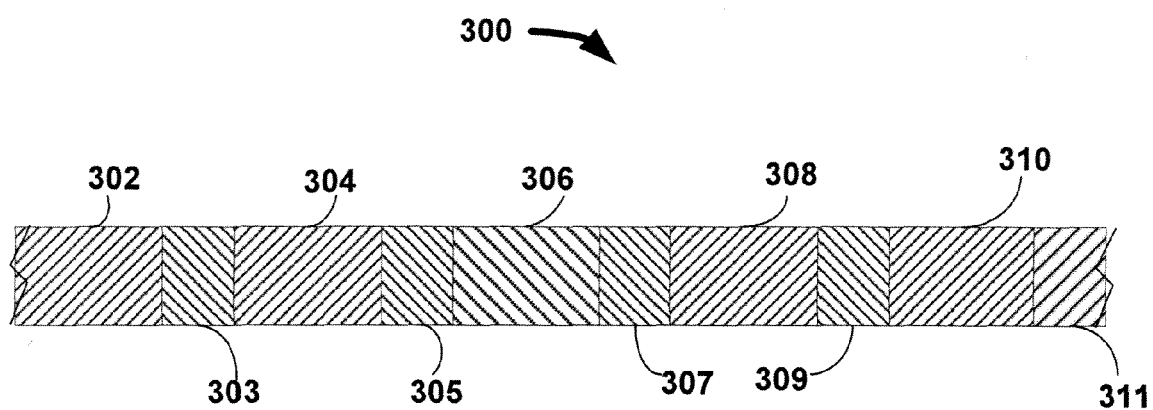
FIG. 3 is a schematic view of a well formed media file in accordance with one embodiment of the invention.

FIG. 3 is a schematic view of a well formed media file in accordance with one embodiment of the invention. The bytes forming file 300 may be grouped into include several blocks of data. In some embodiments, each block of data may include different types of data that form the media of file 300. For example, file 300 may include at least data blocks 302, 304, 306, 308 and 310 of video, and at least data blocks 303, 305, 307, 309 and 311 of audio. File 300 may also or instead include data blocks of other types of data, including for example metadata, text (e.g., closed captioning), alternate audio (e.g., other languages), or any other suitable type of data. Different types of data blocks (e.g., successive audio and video data blocks) may be decoded and synchronized as the media application plays back the media so that the media provided to the user includes both video and audio.

File 300 may be transferred to the electronic device using any suitable approach. For example, the electronic device may receive file 300 sequentially from the beginning (e.g., data block 302) to the end (e.g., data block 311). As another example, the electronic device may instead receive the data blocks of file 300 in a random fashion (e.g., not in bit order). As still another example, the electronic device may receive several sequential series of data blocks.

Figure 4:
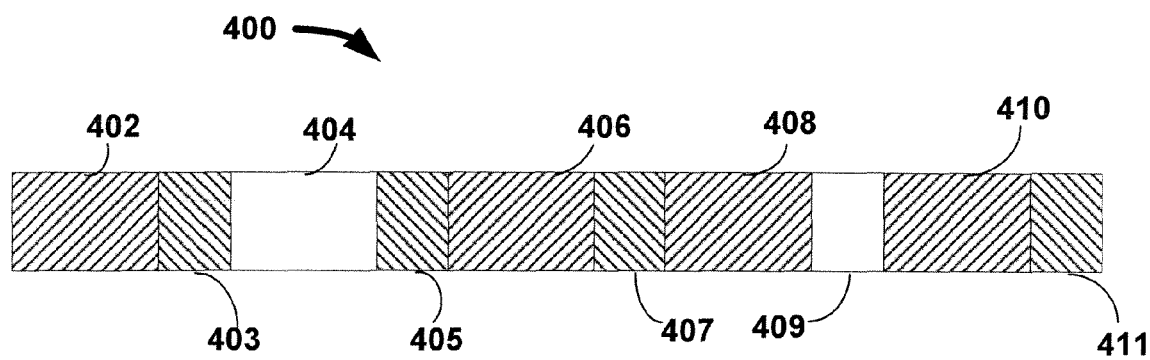
FIG. 4 is a schematic display of the file of FIG. 3 as it is transferred from a server to the electronic device in accordance with one embodiment of the invention.

FIG. 4 is a schematic display of the file of FIG. 3 as it is transferred from a server to the electronic device in accordance with one embodiment of the invention. The transmitted portions of file 400 may include data blocks 402, 403, 405, 406, 407, 408, 410 and 411, which may be the same as data blocks 302, 303, 305, 306, 307, 308, 310 and 311 (FIG. 3). Transmitted file 400 may be missing blocks 404 and 409, which may be the same as data blocks 304 and 309 (FIG. 3). The server may transmit data blocks 404 and 409 to the electronic device at any suitable time, depending for example on the availability of the blocks, the current network traffic, the availability of the electronic device to receive the data blocks, or any other suitable criteria.

Figure 5:
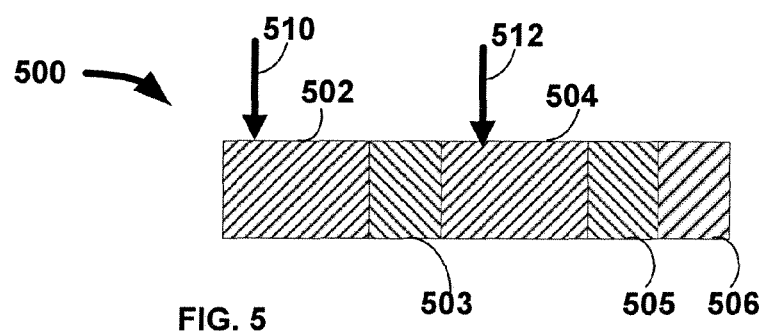
FIG. 5 is a schematic display of a cache in accordance with one embodiment of the invention.

To play back the received media file, the electronic device may identify the data blocks of file 300 to read, and may determine the location of the data blocks in the cache. FIG. 5 is a schematic display of a cache in accordance with one embodiment of the invention. Cache 500 may have a limited size (e.g., smaller than the size of file 300, FIG. 3). The electronic device may populate cache 500 with data blocks 502, 503, 504, 505 and 506 as the data is received from the server until cache 500 is filled.

Once cache 500 is filed, the server may continue to transmit data blocks for file 300 (e.g., because file 300 is larger than cache 500) until the electronic device directs the server to pause or suspend the transfer. The electronic device may use any suitable approach for managing the additional incoming data (e.g., data received once cache 500 is filled). For example, the electronic device may direct the server providing the data to pause or stop transmitting the file. As another example, the electronic device may replace existing data blocks stored in cache 500 with the newly received data. As still another example, the electronic device may transfer data from cache 500 to memory or may store received data in memory These solutions, however, do not take advantage of known attributes of the received files to provide a more efficient processing of received data. For example, a refined approach may be used to download or stream any data file having one or more of the following characteristics: (1) the data file is large (e.g., over a gigabyte); (2) a large portion or all of the data file will eventually be accessed by the client device; and (3) the order in which the data is stored in the data file corresponds well to the order in which the data will be accessed by the client device (e.g., bytes of data that are to be accessed in close temporal proximity are clustered together in the data file). A refined approach may therefore be beneficial for use by a media player to download or cache media files received from a remote server.

In some embodiments, the electronic device may assign dynamic values to each received data block based on properties or attributes of the received data file to more efficiently process received data. For example, the electronic device may assign a dynamically changing value to each data block of file 300 (e.g., independent of whether the data block has been received or cached by the electronic device). Then, when a new data block is received, the electronic device may compare the value of the newly received data block with the value of each data block stored in cache 500. If a data block of cache 300 has a value that is inferior to the value of the newly received data, the electronic device may evict the lower valued data block in favor of the newly received data. Alternatively, if a data block of cache 500 has a higher value than the value of the newly received data, the electronic device may disregard the received data and pause the data transfer.

The electronic device may use any suitable approach for assigning a value to the data blocks of file 300. In some embodiments, the application consuming the cache may explicitly assign values, which may or may not be dynamic, to data blocks of file 300. For example, the application may assign high values to parts of file 300 that should not be evicted from cache 500 until the application no longer reads file 300.

This approach may be used, for example, with classes of media files (e.g., ISO Movie files, QuickTime movie files, and MPEG-4 movie files) that have a "table of contents" which may be required to interpret the file and play it back. When the application (e.g., the media playback stack) identifies the "table of contents" in cache, it may assign a high value to the "table of contents" data block. In some embodiments, the application may instead or in addition assign high values to other important data blocks identified from the table of contents. The assigned values may be maintained as the playhead advances (e.g., unlike values assigned based on a moving anchor, discussed in more detail below). This may be useful, for example, for the "table of contents" data block, which may be needed during playback of the media.

In some embodiments, the value may instead or in addition vary with time or any other variable. For example, data block values may be determined based on an anchor operative to dynamically model the expected use of data blocks during playback. The electronic device may define anchor 510 in cache 500 to serve as a basis for assigning values to data blocks of a received file. In some embodiments, anchor 510 may include a pointer to a particular data block at or near the current position of the playhead.

The electronic device may assign values based on the position of the anchor and on the known next data blocks in the playback stream of the received file (e.g., received media file). For example, the electronic device may assign a highest value to the currently used data blocks, a high value to the following data blocks in the playback stream, a low value to the recently used data blocks, and a lowest value to the data blocks used less recently. This approach may allow, for example, a user to rewind a media file (e.g., to re-listen to missed audio, or to review past video frames) without necessarily needing to request and receive all previously used data blocks.

As the electronic device plays back a received file, the position of the anchor may change with time (e.g., with the current media playback position). Accordingly, the value of each data block of the received file may change based (e.g., directly or indirectly) on the changing current playback position (e.g., on the current position of the playhead 512 in cache 500, FIG. 5). The electronic device may update the value for the data blocks stored in cache at any suitable rate, including for example after reading a certain number of bytes, after a certain number of CPU cycles, or any other period.

In some embodiments, the playhead for a media file may jump between different data blocks (e.g., different types of data blocks) while playing back the media file. For example, after playhead 512 reads a portion of data block 504 of video, playhead 512 may move to data block 503 to read an audio segment (e.g., a portion of data block 503) to be synchronized with the video of data block 504. To prevent the electronic device from assigning a low value to data blocks that precede the data block currently being read by the playhead but that the playhead will return to (e.g., assign a low value to block 503 while reading block 504), the electronic device may define the anchor such that the anchor precedes all of the data blocks that the playhead may read in a near future. For example, if playhead 512 is reading data blocks 503 and 504, the electronic device may set anchor 510 at data block 502. The electronic device may then assign values to data blocks in cache based on the position of anchor 510 (e.g., instead of playhead 512). The anchor may thus be defined by identifying the data block being read by the playhead, identifying other data blocks associated with the currently read data block (e.g., audio data block to be read in conjunction with the video data block), and placing the anchor before the first of the identified data blocks.

When the electronic device receives a new data block for storing in cache, the electronic device may determine the position of the new data block in the file (e.g., file 300, FIG. 3) relative to the anchor defined in cache (e.g., anchor 510 in cache 500, FIG. 5) and dynamically assign a value to the new data block based on the determined position. For example, if the new data block is far in the future, the electronic device may assign a low value to the data block. As another example, if the new data block is in the past, the electronic device may assign a very low value to the data block. As still another example, if the new data block is in the near future, the electronic device may assign a high value to the data block.

Once the electronic device has assigned a value to the newly received data block, the electronic device may compare the value of the new data block with the values of the data blocks stored in cache. If there is at least one data block in cache that has a value that is lower than the value of the new data block, the electronic device may evict one of the lower value cached data blocks in favor of the new data block (e.g., the data block with the lowest value).

If instead the electronic device determines that the newly received data block has a lower value than the value of the data blocks stored in cache, the electronic device may ignore the incoming data block and keep all data blocks currently stored in cache. In some embodiments, the electronic device may direct the server providing the file to pause or stop the data transfer. For example, the electronic device may halt speculative reading of the file from the network (e.g., because the received bytes are less valuable than anything already received, and no more free bytes can be stored in cache). This may be useful with media files where, for example, subsequent data blocks transferred are located temporally after the ignored new data block, and therefore likely have an even lower value than the ignored new data block.

The electronic device may move the anchor at any suitable time. For example, the electronic device may move the anchor at determined intervals (e.g., predetermined time intervals), based on the playhead position, based on the data blocks being read by the playhead, or any other suitable time. When the anchor moves, the electronic device may determine the new value of each data block stored in cache and of each data block of the file not locally stored (e.g., not stored in cache). If the electronic device determines that a data block not stored in cache has a higher value than a data block stored in cache, the electronic device may begin a speculative read from the identified high value data block. As data from the speculative read is received, it may be used to evict and replace lower value data blocks previously stored in cache.

In some embodiments, the electronic device may instead or in addition retain in memory the identity of the last received data block that was not cached (e.g., after the incoming transfer is paused). As playback continues and the anchor moves, and thus as the dynamic values of the data blocks stored in cache change, the electronic device may compare the updated values of the data blocks stored in cache (e.g., the values of data blocks that have been read) with the updated value of the last received data block. When the electronic device determines that the value of the last received data block exceeds the current value of a data block stored in cache, the electronic device may direct the server to resume transferring the file (e.g., provide an instruction to the server to un-pause the transfer and resume the speculative read from the network) and to evict the data block in cache with the lower (or lowest) value.

Figure 6:
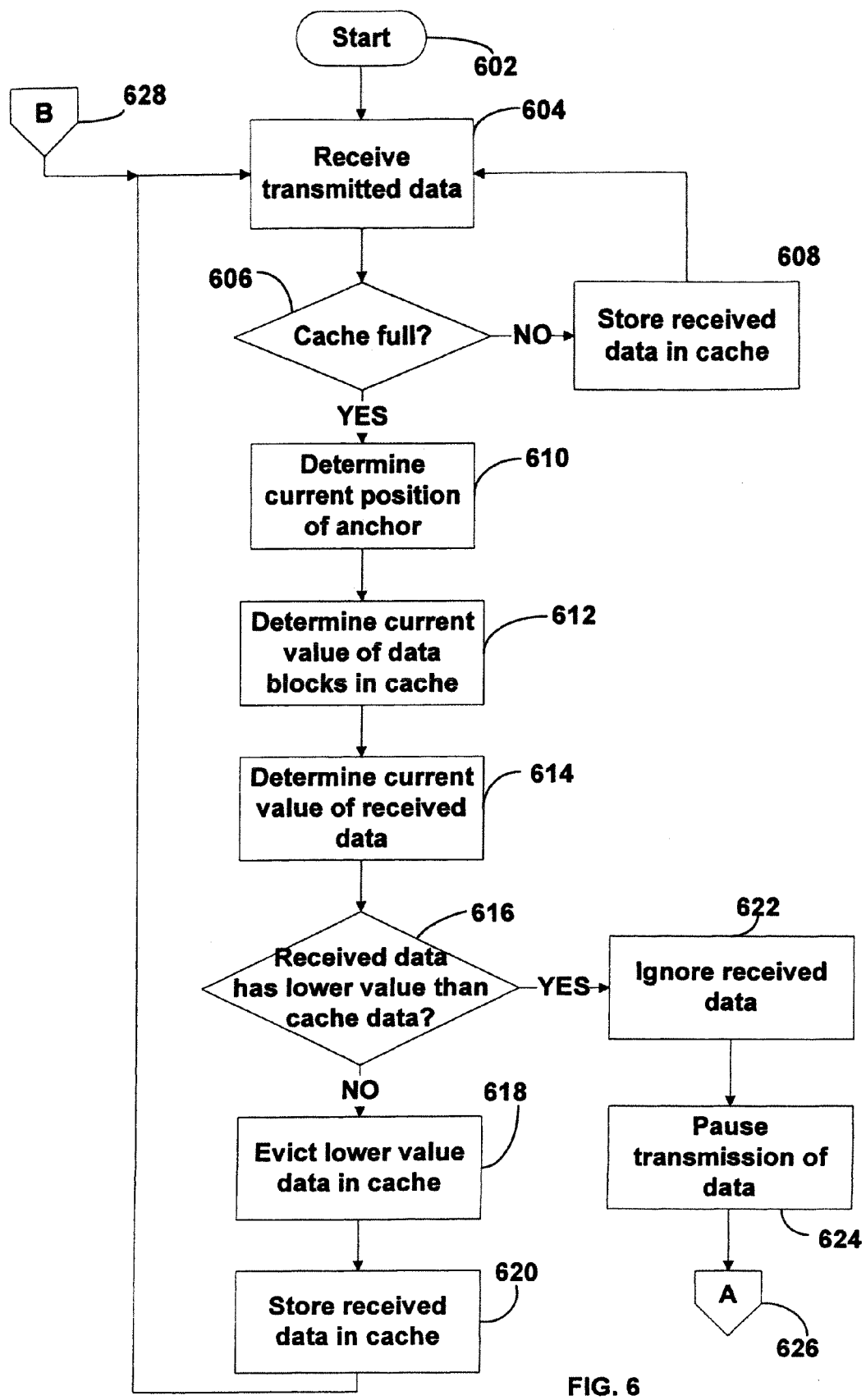
FIG. 6 is a flowchart of an illustrative process for storing data received from a server in cache in accordance with one embodiment of the invention.

The following flowcharts serve to illustrate an illustrative process for managing the data stored in cache in accordance with one embodiment of the invention. FIG. 6 is a flowchart of an illustrative process for storing data received from a server in cache in accordance with one embodiment of the invention. Process 600 may begin at step 602. At step 604, the electronic device may receive transmitted data. For example, electronic device 110 (FIG. 1) may receive data transmitted by server 102 (FIG. 1) using any suitable approach (e.g., using a bulk download vehicle speculative read from the network). At step 606, the electronic device may determine whether its cache is full. For example, control circuitry 202 of electronic device 200 may determine whether cache 204 (FIG. 2) is full. If the electronic device determines that the cache is not full, process 600 may move to step 608. At step 608, the electronic device may store the received data in cache. For example, control circuitry 202 may store the received data in cache 204. Process 600 may then move back to step 604, and continue to receive transmitted data.

If, at step 606, the electronic device instead determines that the cache is full, process 600 may move to step 610. At step 610, the electronic device may determine the current position of an anchor. For example, electronic device 200 may determine the current position of the anchor based on the current position of the playhead in cache 204, the currently read portion of the received file, or combinations of these. The anchor may be defined such that data blocks located after the anchor may be assigned higher value than data blocks located before the anchor. At step 612, the electronic device may determine the current value of the data blocks stored in cache. For example, electronic device 200 may determine the current value assigned to data blocks in cache 204 based on the current position of the anchor. In some embodiments, data blocks previously read by the playhead may be assigned a lower value while data blocks likely to be read in the future may be assigned a higher value.

At step 614, the electronic device may determine the value of the received data. For example, electronic device 200 may identify the data block of the received data, and determine the current value of the identified data block based on the current position of the anchor determined at step 610. As another example, electronic device 200 may identify the explicit value assigned to data blocks by the playback application (e.g., the explicit value of the "table of contents" of some media files). At step 616, the electronic device may determine whether data received at step 604 has a lower value than the data stored in cache. For example, the electronic device may compare the value of the received data determined at step 614 with the value of the data blocks stored in cache that was determined at step 612. If the electronic device determines that at least one data block stored in cache has a lower value than the received data, process 600 may move to step 618. At step 618, the electronic device may evict data stored in cache that has a lower value than the received data. For example, the electronic device may evict the data block stored in cache that has the lowest value. At step 620, the electronic device may store the received data in cache in the place of the evicted data. For example, control circuitry 202 may direct cache 204 to store the received data provided by communications circuitry 208 (FIG. 2). Process 600 may then move back to step 604, and continue to receive data from the server.

If at step 616, the electronic device instead determines that the received data has a lower value than the data already stored in cache, process 600 may move to step 622. At step 622, the electronic device may ignore the received data. For example, the electronic device may direct control circuitry 202 not to store the data in cache 204 or in memory 206. At step 624, the electronic device may direct the server to pause the transmission of data. For example, the electronic device may halt the speculative read of the file from the network. In some embodiments, the electronic device may inform the server that the last received data was not stored in cache, and should be re-sent when the data transmission is resumed.

Figure 7:
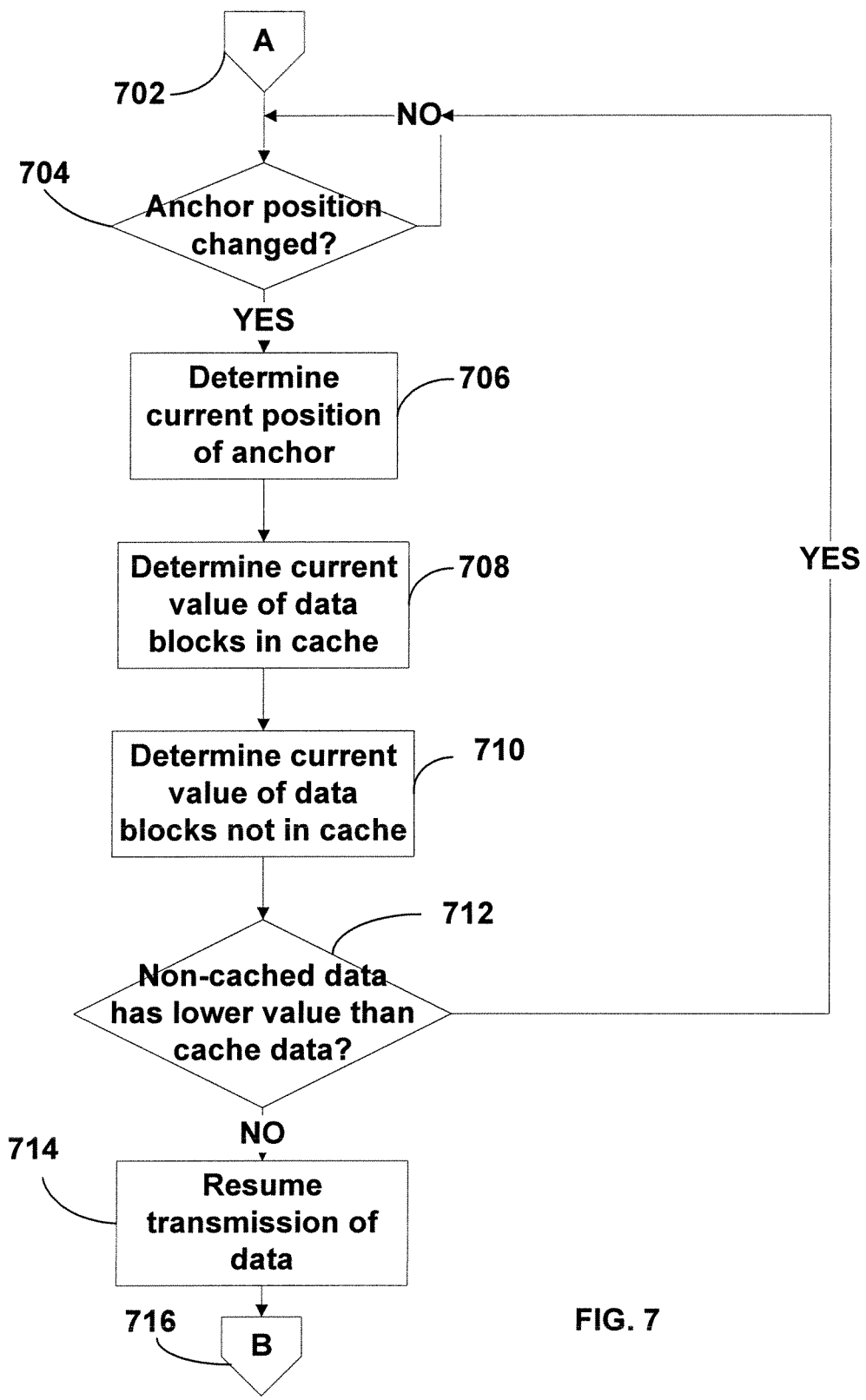
FIG. 7 is a flowchart of an illustrative process for updating values of received data and of data stored in cache in accordance with one embodiment of the invention.

Process 600 may then move to step 626, which may correspond, in some embodiments, to step 702 of process 700 (FIG. 7).

FIG. 7 is a flowchart of an illustrative process for updating values of received data and of data stored in cache in accordance with one embodiment of the invention. Process 700 may begin at step 702. In some embodiments, step 702 may correspond to step 624 of process 600 (FIG. 6). At step 704, the electronic device may determine whether the anchor has moved. For example, control circuitry 202 of electronic device 200 may determine whether the anchor identified in cache 204 (FIG. 2) has moved. In some embodiments, the portion of the anchor may be related to the electronic device playhead used to read the data stored in cache 204. Thus, as the playhead reads additional data (e.g., to display media with electronic device 200), the anchor may move. In some embodiments, the anchor may move in response to explicit direction from the client that the playhead has scrubbed to a different position in time.

If the electronic device determines that the anchor did not move (e.g., the playhead did not advance enough, or the playback of the media was paused), process 700 may move back to step 704, and continue to monitor the position of the anchor.

If, at step 704, the electronic device instead determines that the position of the anchor has changed, process 700 may move to step 706. At step 706, the electronic device may determine the current position of the anchor. For example, electronic device 200 may determine the current position of the anchor based on the current position of the playhead in cache 204 and based on the currently read portion of the file received in the transmission. At step 708, the electronic device may determine the current value of the data blocks stored in cache. For example, electronic device 200 may determine the current value assigned to data blocks in cache 204 based on the current position of the anchor. As another example, electronic device 200 may identify the explicit value assigned to data blocks by the playback application (e.g., the explicit value of the "table of contents" of some media files). In some embodiments, data blocks previously read by the playhead may be assigned a lower priority, and data blocks likely to be read in the future may be assigned a higher priority.

At step 710, the electronic device may determine the value of the data blocks not currently stored in cache. For example, electronic device 200 may identify the data blocks of the file that are not in cache, and determine the current value of the identified data blocks based on the current position of the anchor determined at step 706.

At step 712, the electronic device may determine whether at least one data block not current stored in cache has a lower value than the data stored in cache. For example, the electronic device may compare the value of the data not stored in cache determined at step 710 with the value of the data blocks stored in cache determined at step 708. If the electronic device determines that the data not stored in cache has a lower value than the data stored in cache, process 700 may move back to step 704, and continue to monitor the position of the anchor.

If, at step 712, the electronic device instead determines that at least one data block not stored in cache has a higher value than at least one of the data blocks stored in cache, process 700 may move to step 714. At step 714, the electronic device may resume the transmission of data. For example, electronic device 110 may direct server 102 (FIG. 1) to resume a speculative read of the file based on the identified data block not stored in cache that has a higher value than data stored in cache (e.g., based on the highest value data block not currently stored in cache). Process 700 may then move to step 716, which in some embodiments may correspond to step 604 of process 600 (FIG. 6).

In some embodiments, instead of determining the new value of all data blocks of the file that are not currently stored in cache at step 710, the electronic device may determine the value of the last transmitted data block before the transmission was paused (e.g., at step 624, FIG. 6). Following a determination that the last transmitted data block has a higher value than a data block currently stored in cache, the electronic device may resume the transmission of the file starting with the last transmitted data block (e.g., resume a speculative read based on the last transmitted data block prior to pausing the data transmission. This approach, however, may require the electronic device to remember the last transmitted data block prior to pausing the transmission.

In some embodiments, process 700 may preemptively evict data stored in cache that has a lower value than received data prior to moving to step 716. For example, the electronic device may evict the data block stored in cache that has the lowest value. The electronic device may then store the received data in cache in the place of the evicted data. For example, control circuitry 202 may direct cache 204 to store the received data provided by communications circuitry 208 (FIG. 2). Process 700 may then move to step 716.

Processes 600 and 700 may end when the server has no more data to transmit (e.g., the entire file was transmitted) or when the electronic device ends the transmission (e.g., the electronic device stops the application that was requesting the data from the server).

The above described embodiments of the present invention are presented for purposes of illustration and not of limitation, and the present invention is limited only by the following claims.

What is claimed is:

1. A method for transferring a media file, comprising:
   storing received data blocks of a media file in cache;
   defining a dynamic anchor;
   assigning a value to each data block of the media file based on the defined anchor;
   determining that the cache is full;
   pausing the transfer of the media file in response to determining that the value of the data blocks stored in the full cache exceeds the value of a subsequently received data block.

2. The method of claim 1, further comprising:
   receiving a data block;
   determining the value of the received data block; and
   comparing the determined value of the received data block with the assigned values of the data blocks stored in cache.

3. The method of claim 1, wherein defining further comprises:
   identifying the position of a playhead in cache; and
   defining the anchor before the identified position.

4. The method of claim 3, further comprising:
   identifying a plurality of data blocks associated with the position of the playhead in cache;
   locating the first of the identified plurality of data blocks in the media file; and
   defining the anchor at the located first identified data block.

5. The method of claim 1, further comprising:
   changing the position of the anchor;
   modifying the values associated with each data block of the media file based on the changed position of the anchor; and
   determining whether a data block not stored in cache has a higher modified value than a data block stored in cache.

6. The method of claim 5, further comprising resuming the transfer of the media file.

7. The method of claim 5, wherein changing further comprises changing the position of the anchor based on the position of the playhead.

8. The method of claim 1, further comprising:
   identifying the subsequently received data block; and
   determining the value of the identified received data block.

9. The method of claim 8, further comprising:
   determining that the value of the identified received data block exceeds the value of a particular data block stored in cache;
   evicting the particular data block stored in cache; and
   storing the identified received data block in cache.

10. A method for receiving a media file, comprising:
    storing received data blocks of a media file in cache;
    defining a dynamic anchor, wherein the dynamic anchor is based on the position of a playhead that reads data blocks in cache;
    assigning a value to each data block of the media file based on the defined anchor; and
    replacing a particular data block stored in cache in response to receiving a data block having an assigned value that exceeds the value of the particular data block.

11. The method of claim 10, further comprising:
    determining that cache is full; and
    replacing in response to determining.

12. The method of claim 10, further comprising:
    changing the position of the anchor;
    assigning new values to each data block based on the changed position of the anchor; and
    replacing based on the new values of the data blocks.

13. The method of claim 10, further comprising:
    detecting the data block being currently read by the playhead; and
    wherein changing further comprises changing based on the detected data block.

14. The method of claim 13, further comprising:
    identifying at least one data block associated with the detected data block; and
    wherein defining further comprises associating the anchor with the first of the identified and detected data blocks.

15. The method of claim 14, wherein the identified and detected data blocks comprise a video data block and an audio data block.

16. An electronic device operative to receive a media file, the electronic device comprising control circuitry, communications circuitry and a cache, the control circuitry operative to:
    direct the communications circuitry to receive data blocks associated with a media file;
    store the received data blocks in the cache;
    define a dynamic anchor in the cache;
    assign a value to each data block associated with the media file based on the defined dynamic anchor;
    determine that the cache is full; and
    direct the communications circuitry to pause the transfer of the data blocks in response to determining that the assigned value of a subsequently received data block is less than the assigned value of data blocks stored in the full cache.

17. The electronic device of claim 16, wherein the control circuitry is further operative to:
    play back the received media file;
    determine the current position of a playhead in cache; and define the dynamic anchor based on the determined current position of the playhead.

18. The electronic device of claim 17, wherein the control circuitry is further operative to:
   identify a plurality of data blocks to be read in conjunction with the data block being read by the playhead; and
   select the earliest of the identified plurality of data blocks; and
   define the anchor at the selected data block.

19. The electronic device of claim 16, wherein the control circuitry is further operative to:
   change the position of the anchor;
   assign new values to each of the data blocks stored in cache; and
   direct the communications circuitry to resume the transfer of the media file in response to determining that the assigned new value of a particular data block not stored in cache is more than the new assigned value of a data block stored in cache.

20. The electronic device of claim 19, wherein the control circuitry is further operative to direct the communications circuitry to resume the transfer by requesting the particular data block.

21. The electronic device of claim 16, wherein the control circuitry is further operative to assign the highest value to data blocks necessary for processing the received media file.

22. The electronic device of claim 21, wherein the necessary data blocks comprise data blocks for the table of contents of the media file.

* * * * *